United States Patent [19]

Edmisten

[11] Patent Number: 4,863,001
[45] Date of Patent: * Sep. 5, 1989

[54] BRAKE APPARATUS

[75] Inventor: Frank D. Edmisten, Troy, Ohio

[73] Assignee: The BF Goodrich Company, Akron, Ohio

[ * ] Notice: The portion of the term of this patent subsequent to Nov. 15, 2005 has been disclaimed.

[21] Appl. No.: 193,613

[22] Filed: May 13, 1988

Related U.S. Application Data

[63] Continuation of Ser. No. 16,151, Feb. 18, 1987, Pat. No. 4,784,246.

[51] Int. Cl.4 ............................................. F16D 65/12
[52] U.S. Cl. .......................... 188/218 XL; 188/251 A; 188/71.5; 192/107 M; 192/107 R
[58] Field of Search ........... 188/218 XL, 251 A, 71.4, 188/71.5; 192/107 R, 107 M; 403/365, 381

[56] References Cited

U.S. PATENT DOCUMENTS

| | | | |
|---|---|---|---|
| 3,250,349 | 5/1966 | Byrnes et al. | 192/107 R |
| 3,550,740 | 12/1970 | LeBlanc | 188/218 XL |
| 3,712,427 | 1/1973 | Cook et al. | 188/218 XL |
| 3,757,907 | 9/1973 | Crossman et al. | 188/218 XL |
| 3,927,740 | 12/1975 | Zarembka | 188/218 XL |
| 3,972,395 | 8/1976 | Jannasch et al. | 188/218 XL |
| 4,007,814 | 2/1977 | Berger | 188/218 XL |
| 4,249,642 | 2/1981 | Anderson et al. | 188/218 XL |
| 4,465,165 | 8/1984 | Bok | 188/218 XL |
| 4,469,204 | 9/1984 | Bok et al. | 188/218 XL |
| 4,557,356 | 12/1985 | Peterson | 188/218 XL |
| 4,721,191 | 1/1988 | Dowell | 188/218 XL |

Primary Examiner—Andres Kashnikow
Assistant Examiner—Mark T. Le
Attorney, Agent, or Firm—Joseph Januszkiewicz

[57] ABSTRACT

A cap clip for a slot in a brake disc wherein a pair of circumferentially spaced cap clips are mounted on the peripheral edges of each circumferential slot. Each cap clip has an arcuate extension that seats into an arcuate recess in the bottom corner of each slot. Each cap clip also has side portions that functionally engage the annular sides of the brake disc and also may have a top portion and a front portion that seat on the periphery of the brake disc and the side wall of the slot respectively. The pair of cap clips in each slot are not interconnected but are separately retained in their positions in the slots. Such brake disc also may have one retainer located on the periphery of the brake disc between adjacent slots and retained thereon by connection to the clips to reduce oxidation of the brake disc.

4 Claims, 9 Drawing Sheets

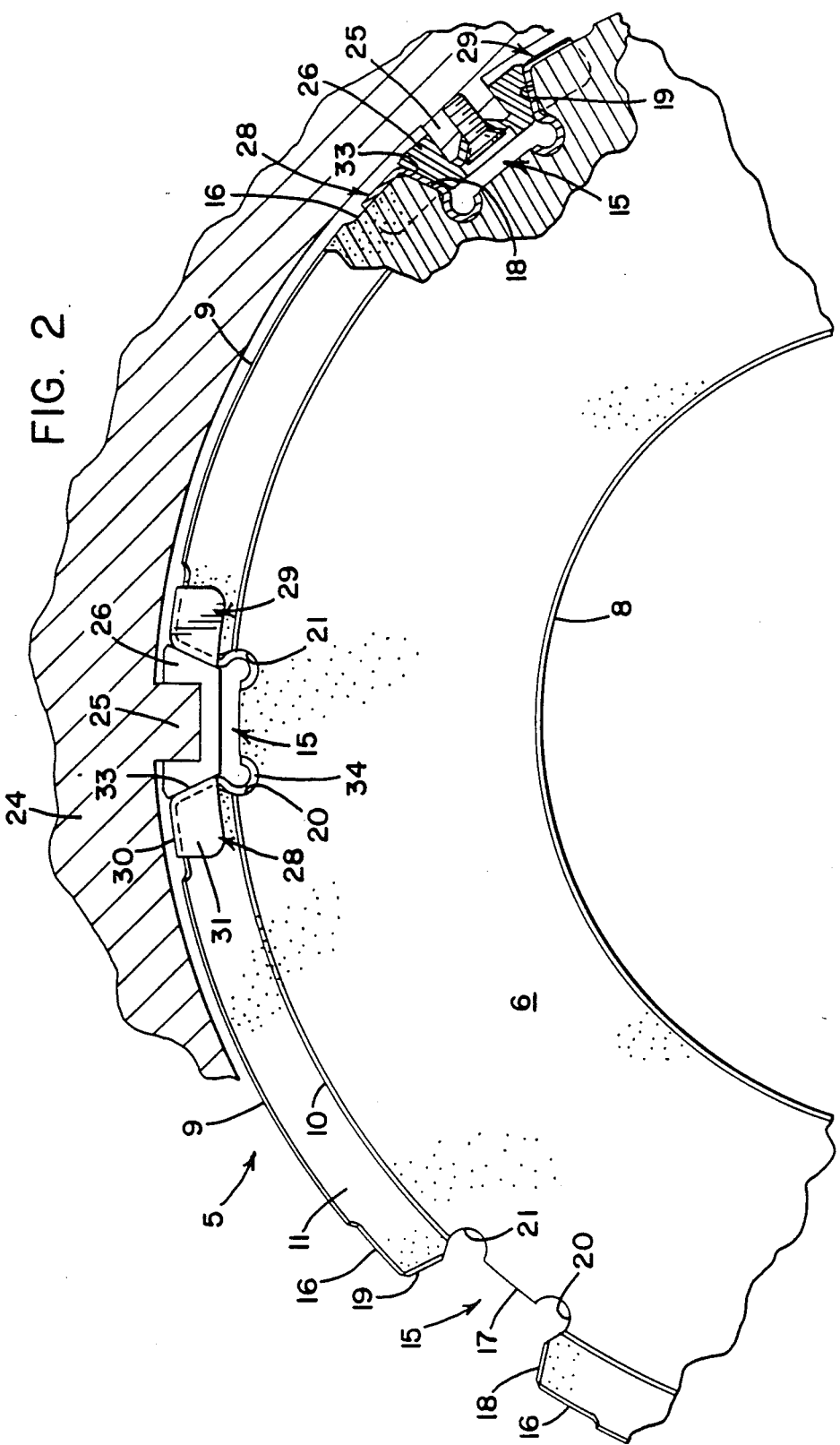

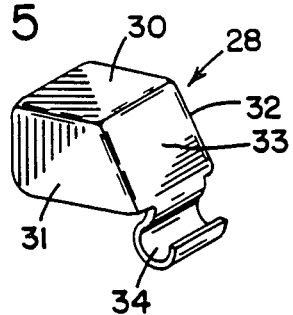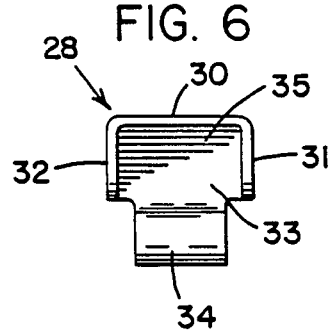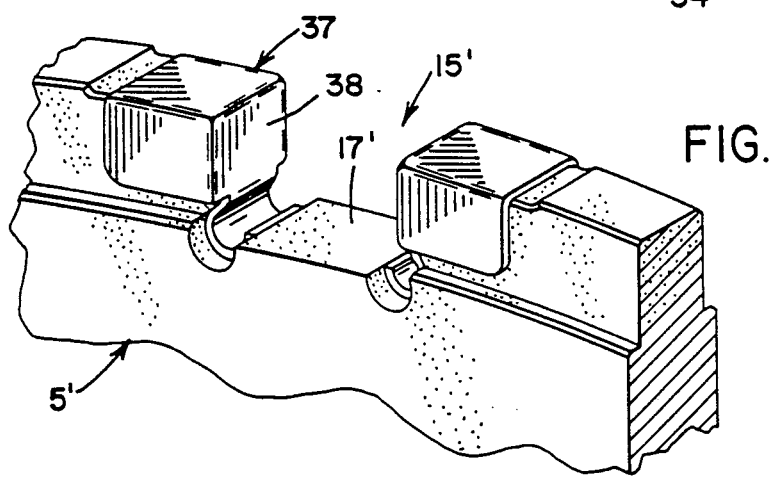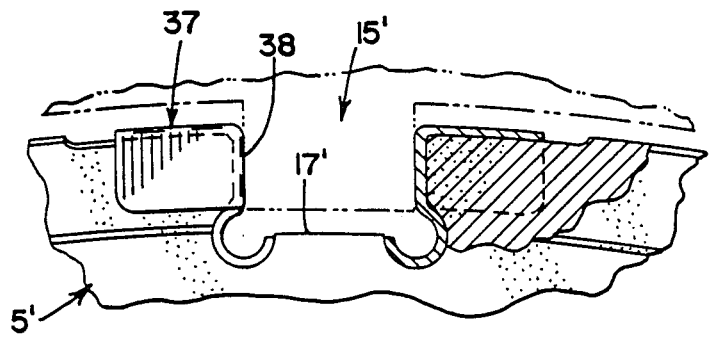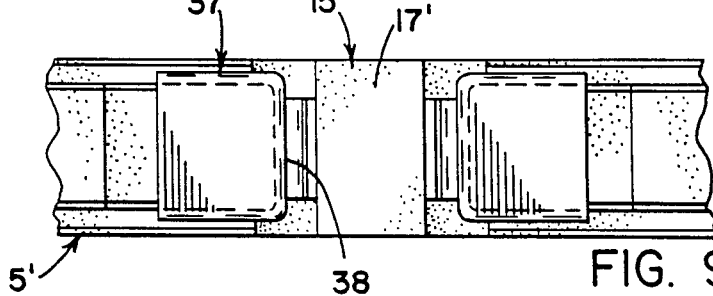

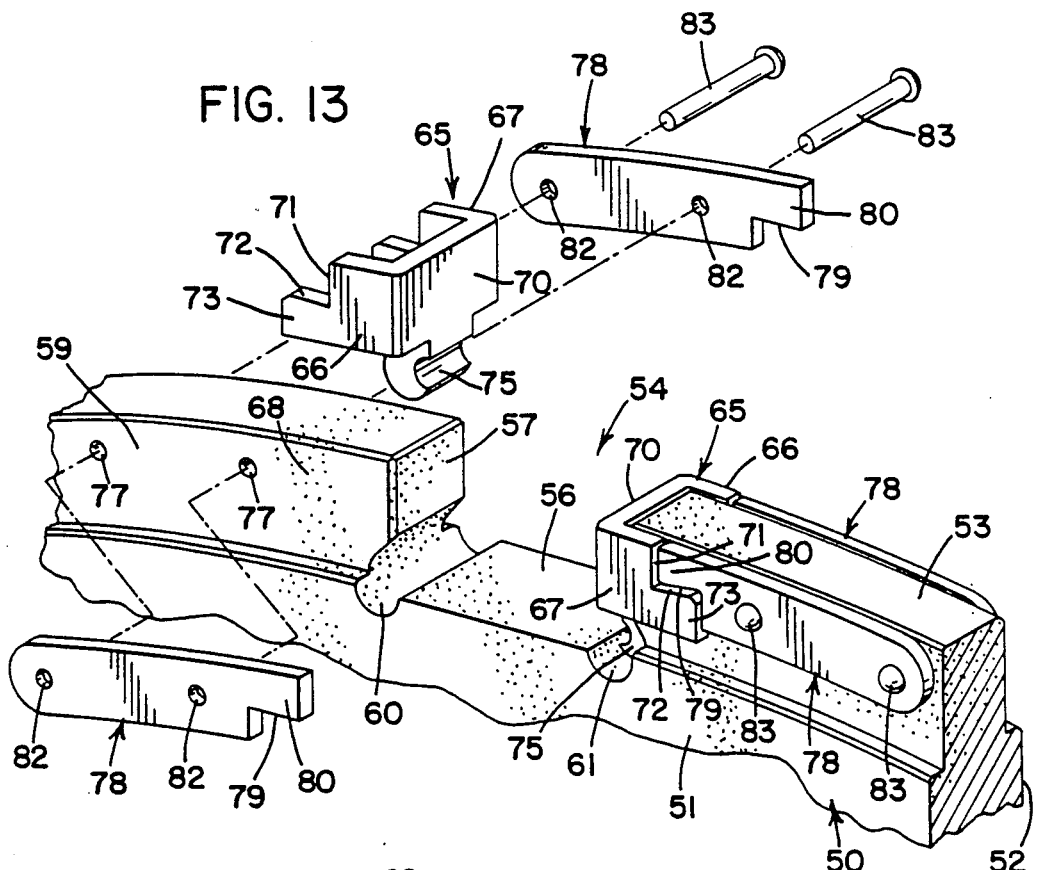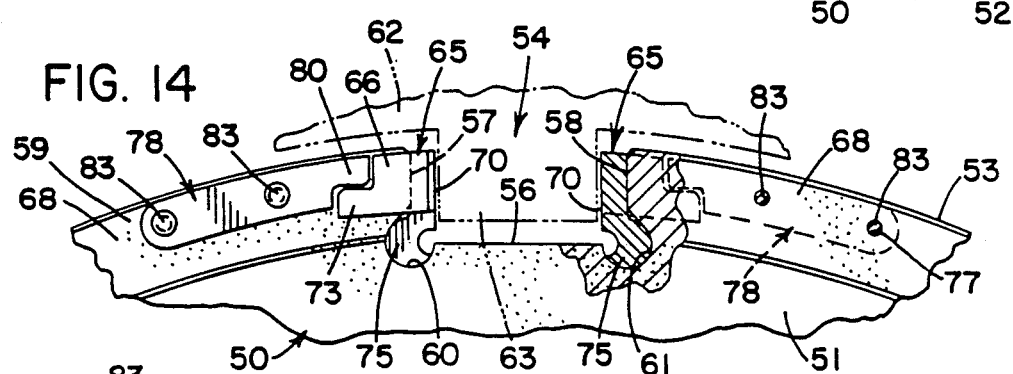

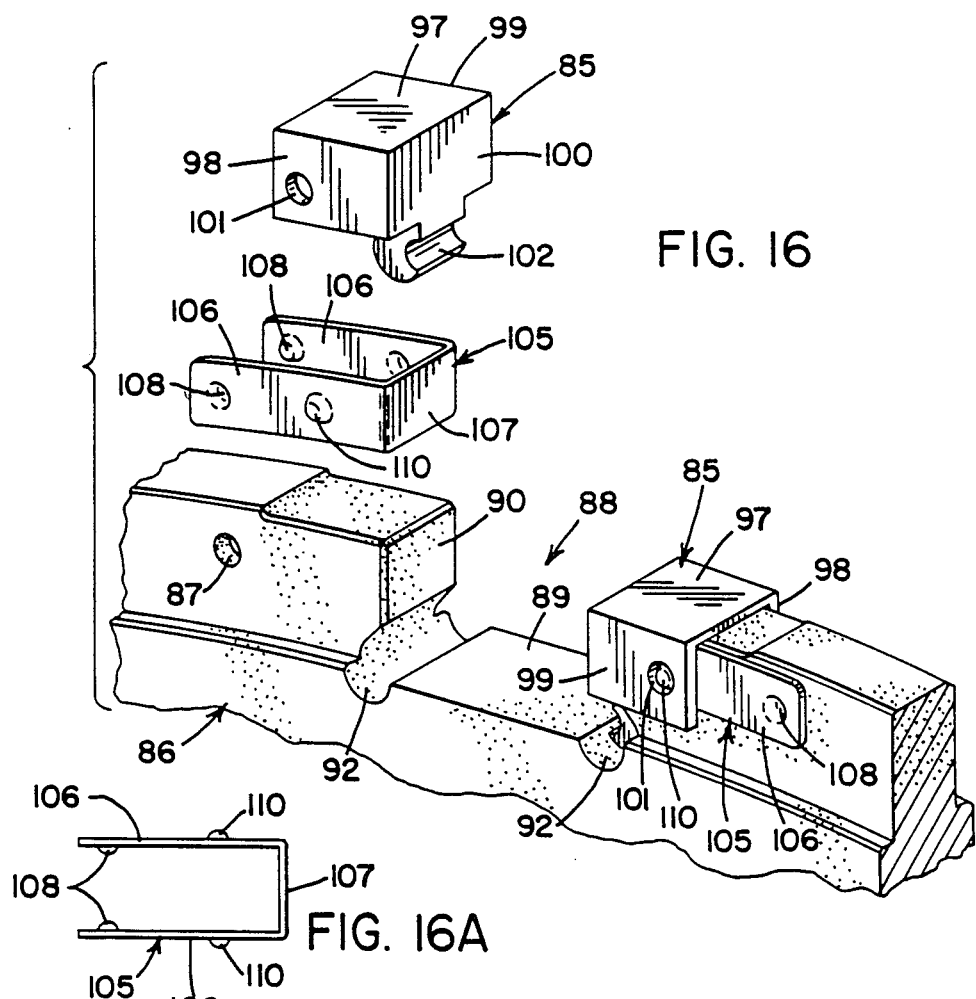
FIG. 16
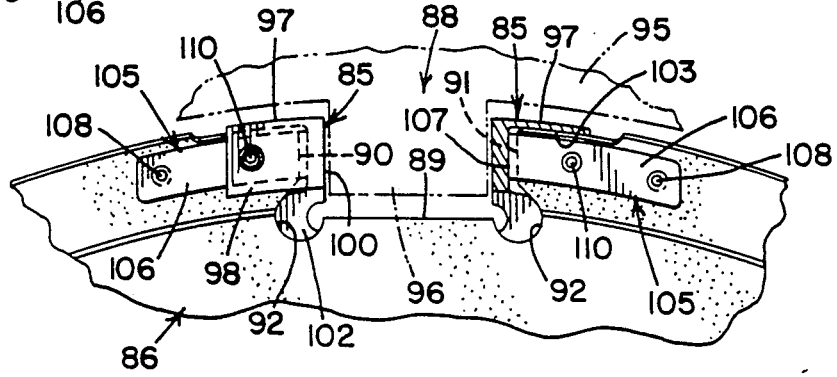
FIG. 16A
FIG. 17

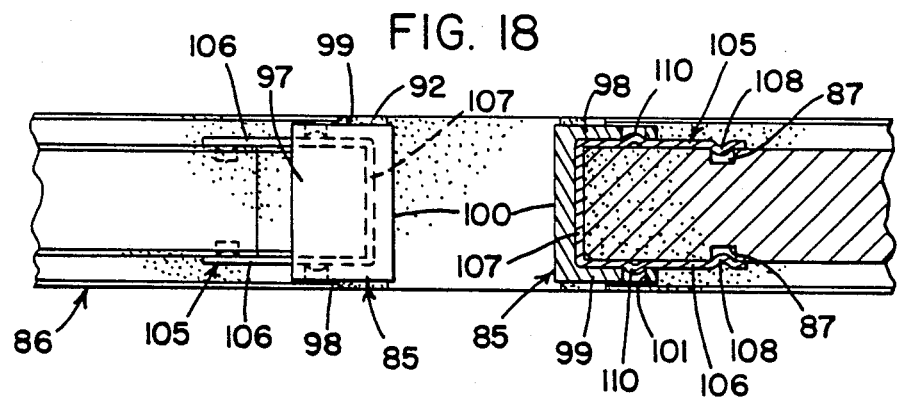
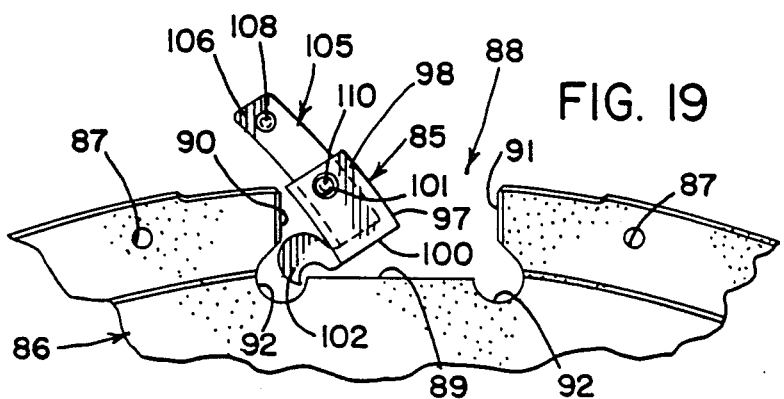
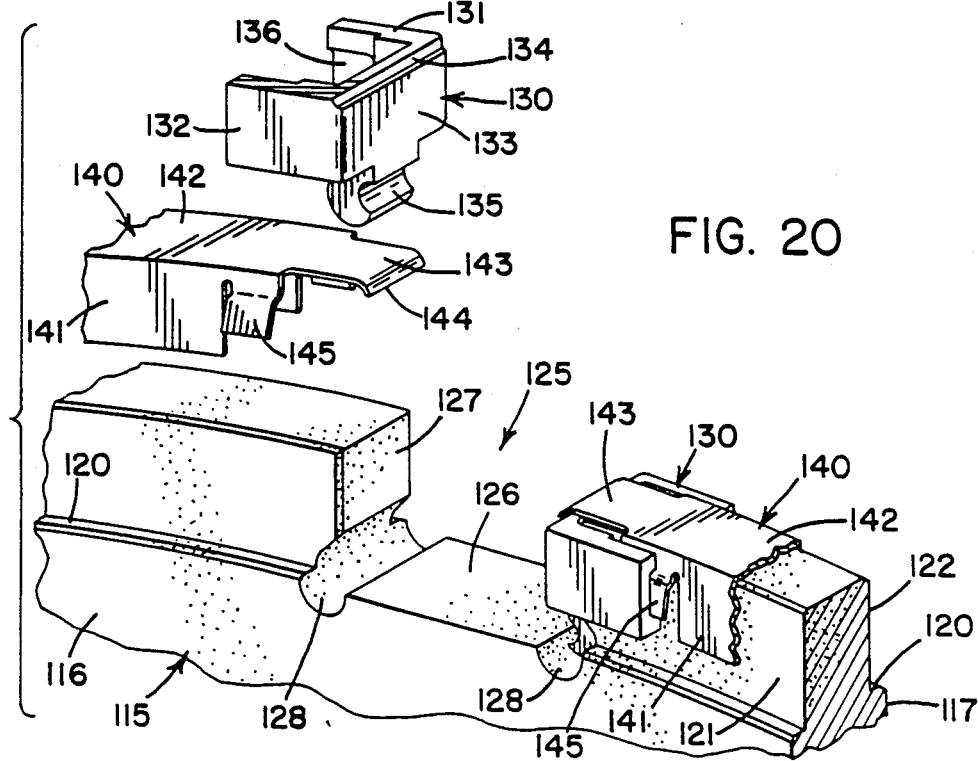

BRAKE APPARATUS

This is a division, of application Serial No. 016,151, filed Feb. 18, 1987. Now U.S. Pat. No. 4,784,246 issued date 11/15/88.

BACKGROUND OF THE INVENTION

This invention relates to aircraft brake disc and more particularly to drive clips for reinforcing the peripheral slots in aircraft brake discs made of carbon.

Aircraft brake assemblies employ a plurality of axially aligned brake discs wherein one set of alternate discs are splined to the wheel rim while the remaining alternate discs are splined to the axle housing. To accommodate the splined connections, the peripheral slots have drive clips mounted therein for reinforcement purposes to compensate for the limitations of the physical properties of the carbon discs and to give increased wear characteristics. The conventional design in the use of brake drive clips is to provide a plurality of bores adjacent to the slots so that clips or inserts located in the slots are retained thereon by rivets and pins extending through the clips and the discs to retain the drive clips in place as they help transfer the load to the carbon discs. The clips or inserts of the present invention utilize caps that captively seat on the respective peripheral side portions of the slots requiring no fasteners such as rivets, pins or screws to thereby reduce complexity, weight, and cost of the assembly. The cap clips or inserts of the instant invention are relatively significantly easier to install and replace than the riveted inserts of the prior art. Cap clips can be replaced without disassembling the brake. A further serious disadvantage of riveted clips is their failure or their loosening which leads to insert failures and damage to the brake and/or wheel assembly. Various modifications of the cap drive clips of the instant invention incorporates retainers which prevents the clips that loosen during service from dislodging when the wheel is removed. An additional unexpected benefit of the geometry of the instant invention is its ability to be non-resonant with the frequencies of vibration that the brake discs go through when compared to and experienced by prior inserts and discs. An additional benefit of some versions of the instant invention is to significantly protect the carbon disc from oxidation in the drive clip area as well as the outer peripheral area of the brake disc.

SUMMARY OF THE INVENTION

The advantages of the present invention will become more apparent from the detailed description as hereinafter set forth wherein the brake disc has oppositely disposed annular surfaces with a plurality of circumferentially spaced slots with reinforcing means in each slot. Each of such slots have a pair of drive clips located on the opposite side walls, and operate independently of each other. Such clips are generally U-shaped in configuration with a forwardly disposed front face and side walls to captively seat on the peripheral side portion of the disc adjacent to the slot. Each slot has an annular recess adjacent the juncture of the bottom of the slot and the adjacent sides to receive an annular extension of the drive clips which firmly recures the clips in their positions in the slots.

BRIEF DESCRIPTION OF THE DRAWINGS

FIG. 2 is a fragmentary side elevational view of a brake disc assembly with a key slot and drive clips positioned into the respective peripheral slots;

FIG. 5 is a perspective view of a drive clip;

FIG. 6 is a front elevational view of a clip;

FIG. 7 is a fragmentary perspective side elevational view of a brake disc and a modified form of clips located on a peripheral slot;

FIG. 8 is a side elevational view of the brake disc and drive clips shown in FIG. 7 with a portion broken away to show the cross-sectional view of one clip;

FIG. 9 is a plan view of the brake disc and clips shown in FIG. 7;

FIG. 13 is an exploded perspective view of a brake disc and another modified form of clips for positioning on the peripheral slot of a brake disc;

FIG. 14 is a side elevational view of the brake disc and clips shown in FIG. 13 with a portion of the clip broken away to show the cross-sectional view of such clip;

FIG. 15 is a plan view of the brake disc and clips shown in FIG. 14;

FIG. 16 is an exploded perspective view of a brake disc and another modified form of clips for cooperative engagement with the peripheral slots of a brake disc;

FIG. 16A is a plan view of retainer used in clip shown in FIG. 16;

FIG. 17 is a side elevational view of the brake disc and clips shown in FIG. 16 with a portion of one clip broken away to show the cross-sectional view of such clip;

FIG. 18 is a plan view of the brake disc and insert shown in FIG. 17;

FIG. 19 is a side elevational view of a portion of the brake disc and one clip as depicted by FIG. 17 illustrating the clip being positioned for insertion onto the peripheral edge of a slot;

FIG. 20 is a perspective side elevational view of a brake disc with a further modified clip including an exploded view of the oppositely disposed clip and one clip and retainer mounted on one side of the disc adjacent a slot;

DESCRIPTION OF THE PREFERRED EMBODIMENT

Figure 1:
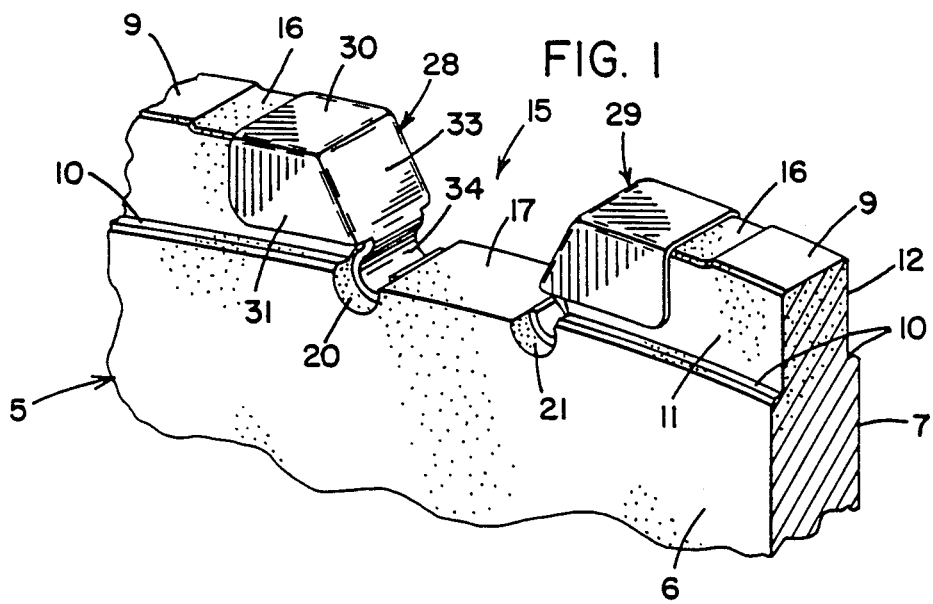
FIG. 1 is a fragmentary perspective side elevational view of a portion of a brake disc with drive clips or drive cap clips located on the respective peripheral side portions of the disc.
Figure 3:
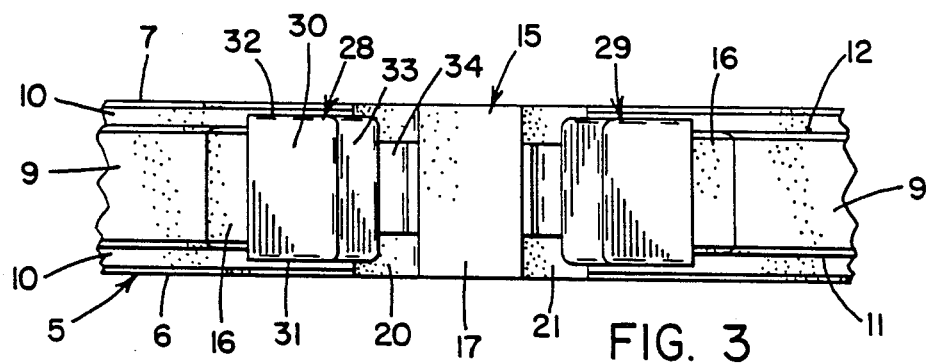
FIG. 3 is a plan view of the brake disc assembly shown in FIG. 2.
Figure 4:
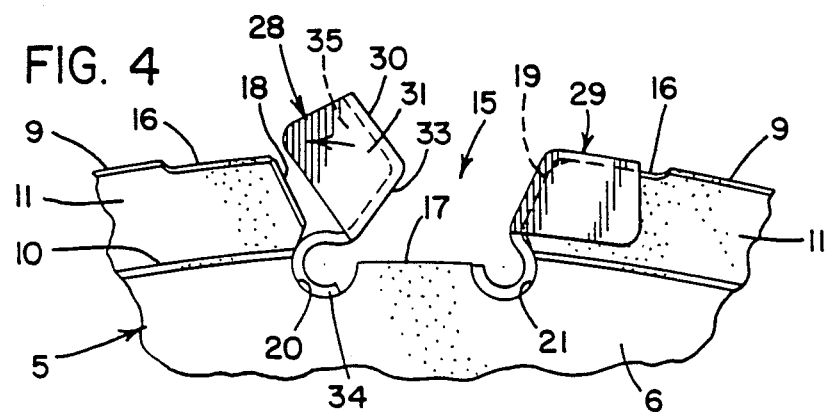
FIG. 4 is a fragmentary side elevational view of a brake disc with one clip mounted on one side of the slot while the opposing clip being positioned for rotation into position on the opposite side of the slot.

Referring to the drawings, wherein like reference numerals designate like or corresponding parts throughout the several views, there is shown in FIG. 1 a friction brake disc 5 in the form of a rotor of a multiple disc aircraft brake. Only a portion of one rotor disc is shown, it being understood that in a multiple disc brake system that multiple discs refer to the plurality of axially spaced-apart annular rotor discs which are suitably splined for axial movement along a mating key or spline that is part of the rotating wheel. The plurality of annular rotors are interleaved with annular stator discs which in turn are suitably splined for axial movement along a mating member (or members) that is secured to a torque tube not shown. Disc 5 is an annular member having a pair of flat annular wall surface 6 and 7 with an inner peripheral surface 8 and an outer peripheral surface 9. The uppermost side walls of disc 5 for the full circumferential extent thereof is recessed or reduced slightly in thickness to provide a shoulder 10 on each annular side wall and two circumferentially extending annular wall surfaces 11 and 12. Such shoulder 10 is at the juncture of the flat annular wall surfaces 6 and 7 with the two circumferentially extending side walls 11 and 12. As seen in FIGS. 1 and 2, disc 5 has a plurality of circumferentially spaced slots 15 along its outer periphery. The upper peripheral surfaces of the disc 5 adjacent to the slots 15 are recessed as at 16 to facilitate the assembly of the drive clips thereto. Each slot 15 has a bottom surface 17 and two diverging side walls 18 and 19. The respective edges of the side walls 18 and 19, the edges of the recesses 16, the outer peripheral surface 9 and the outer edges of the shoulder 10 are chamfered as seen in FIGS. 1 through 4.

The respective junctures of the bottom surface 17 and the adjacent side walls 18 and 19 have arcuate recesses 20 and 21, respectively, for a purpose to be described. Such arcuate recesses extend below the bottom surface 17 and into the side walls 18 and 19. The side walls 18 and 19 are also referred to as drive faces for engagement by splines of torque devices to be described.

The disc 5 is fabricated from a carbon material such as bulk graphite or carbon fabric composite. The discs 5 can be molded from chopped fibers of cellulose or other carbonizable material as is old and well known in the art.

A torque device 24 (shown in cross section in FIG. 2) is located adjacent to the outer periphery of the disc 5 (only a portion shown in FIG. 2). Torque device 24 has a plurality of splines or ribs 25 which have suitably fastened to it a generally U-shaped insert 26 which project into slots 15 to provide a means for applying a load or force on the discs 5 by its engagement with slots 15. Such insert 26 have straight or tapered sides to complement the shape of slot 15.

Located in each slot 15 are a pair of spaced metal cap clips 28 and 29 defining a slot reinforcing means to provide means for driving contact from the inserts 26 of splines 25 of torque device 24. Each metal clip 28 has a flat planar top section 30, a pair of spaced sides 31 and 32, and a front section 33. Front section 33 is tapered relative to the top section 30 such that when the metal cap insert 28 is inserted onto the edge of the disc 5 adjacent to the slot 15, top section 30 will abut the recessed portion 16, while the tapered front section 33 will contact and seat against the diverging side walls 18. The respective sides 31 and 32 frictionally engage the wall surfaces of the brake disc 5 adjacent to the disc slots 15. The front section 33 of cap clip 28 has an arcuate extension or arcuately shaped projection 34 that frictionally contacts the arcuate wall of recess 20. Such arcuate extension 34 operates as a retaining or securing means for positively locking the cap clip 28 onto the edge of disc 5 adjacent to slot 15 so that the front section 33 engages the adjacent wall of U-shaped insert 26. The front section 33, sides 31 and 32 and the top section 30 of clip 28 define an interior chamber 35 (FIG. 6) that snugly seats onto the peripheral edge portion of disc 5 adjacent to the slots 15 and are retained thereon by the arcuate extensions 34.

Cap clip 29 is identical in construction as clip 28 however its placement onto the other peripheral edge portion of disc 5 is reverse that of cap clip 28. Under the unitary and self contained construction and placement of such cap clips 28 and 29 on the peripheral edges of disc 5 there is no need to rivet such clips to the brake discs since such cap clips 28 and 29 are essentially self locking thereon.

A modification of the cap clips 28 is shown in FIGS. 7 through 9 wherein a cap clip 37 is essentially identical to that of cap clip 28 except that the front section 38 is substantially a vertical wall that is normal to the bottom surface 17' of the slot 15' in the brake disc 5' of FIG. 7. The front section 38 lies along a line that is essentially parallel to a radial centerline of disc 5'. All additional modifications hereinafter described may have either straight or angle drive faces.

Figure 10:
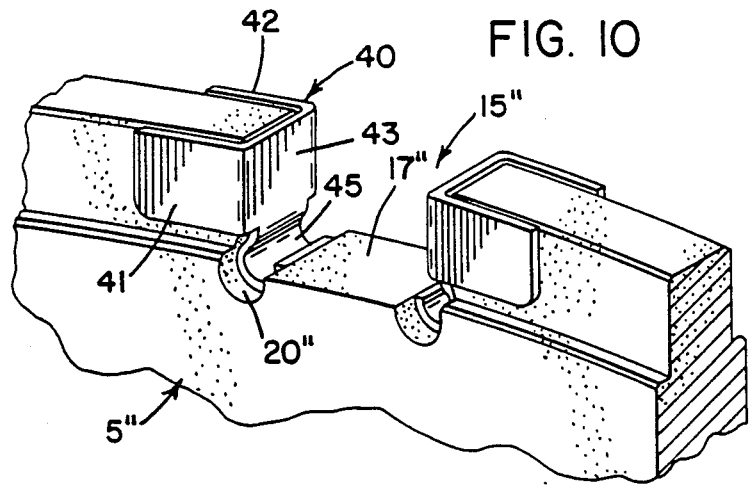
FIG. 10 is a fragmentary perspective side elevational view of a brake disc and a further modified form of clips located on a peripheral slot of the brake disc.
Figure 11:
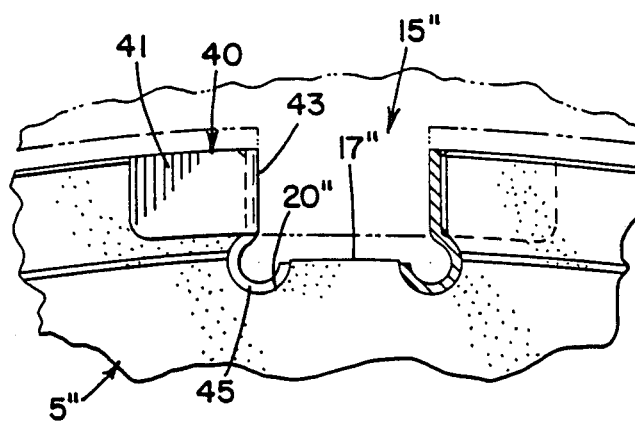
FIG. 11 is a side elevational view of the brake disc and clips shown in FIG. 10 with a portion broken away to show the cross-sectional view of one clip.
Figure 12:
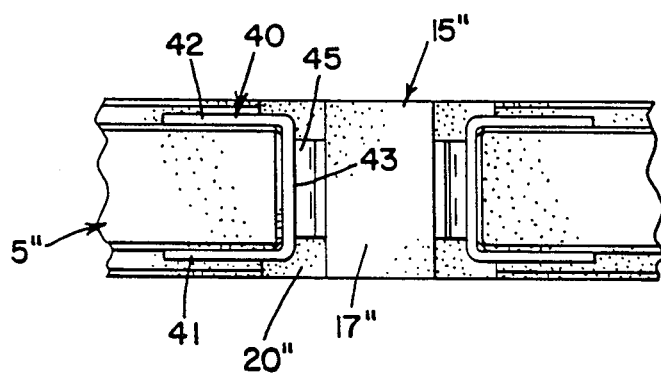
FIG. 12 is a plan view of the brake disc and clips shown in FIG. 10.
Figure 21:
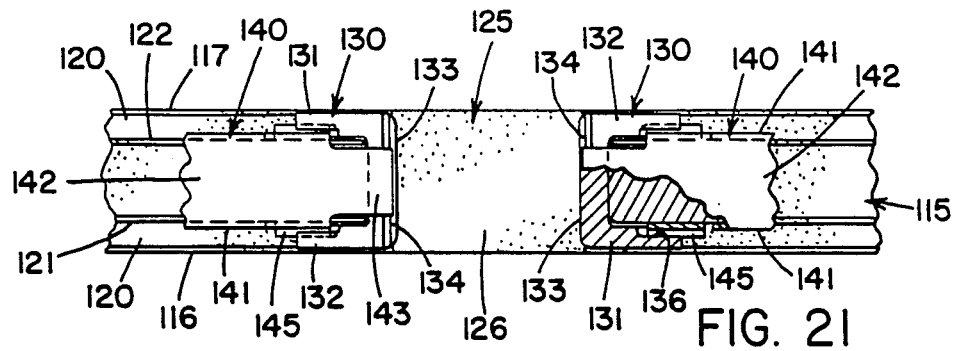
FIG. 21 is a plan view of the brake disc and clips of FIG. 20 with a portion of one clip broken away.

A further modification of the cap clips 28 and 37 is shown in FIGS. 10 through 12 wherein a cap clip 40 is essentially identical to that of cap clip 37 except that the top section is eliminated to reduce the cost of fabrication of the clip. Cap clip 40 has a pair of spaced sides 41 and 42 and a front section 43. Front section 43 is substantially perpendicular to the bottom surface 17" of a slot 15" in the brake disc 5". The front section 43 of cap clip 40 has an arcuate extension or arcuately shaped projection 45 that frictionally contacts an arcuate wall surface of a recess 20" in disc 5" similar to recess 20 in disc 5.

A further modification of the cap clip is shown in FIGS. 13 through 15. Disc 50 is an annular member having a pair of flat annular wall surfaces 51 and 52 with an inner peripheral surface (not shown) and an outer peripheral surface 53. Disc 50 has a plurality of circumferentially spaced slots as in the first embodiment, however, only one slot 54 is shown along its outer periphery. Each slot 54 has a bottom surface 56 and two vertically disposed side walls 57 and 58. The respective edges of the side walls 57 and 58 and the edges of the outer peripheral surfaces 53 are chamfered as seen in FIGS. 13 and 14.

The respective junctures of the bottom surface 56 and the reduced portions 59 of adjacent side walls 51 and 52 have arcuate recesses 60 and 61, respectively, for a purpose to be described.

The disc 50 is fabricated from a carbon material as described in the first embodiment.

A torque device 62 (shown in phantom lines in FIG. 14) is located adjacent to the outer periphery of the disc 50 (only a portion shown in FIG. 14). Torque device 62 has a plurality of splines or ribs 63 which project into slots 54 to provide a means for applying a load or force on the brake discs 50 by its engagement with such slots 54.

A pair of metal inserts or clips 65 are located within each slot 54 to provide a reinforcement means for driving contact from the splines 63 of torque device 62. Each clip has a generally U-shaped configuration, with a pair of side wall sections 66–67 which are adapted to engage the planar side walls 68–68 of the upper circumferentially annular wall of brake disc 50.

The respective side walls 66 and 67 of each clip are interconnected by a bridging section 70. The bridging section is in abutting contact with either side wall 57 or 58 of slot 54. Each of the side walls 66 and 67 are notched at its outermost corner thereby presenting shoulders 71 and 72 and a stepped lower extension or projection 73. The respective shoulders 71 and 72 are at right angles to each other. Each clip 65 has a downwardly extending projection 75 that is arcuate in shape for a frictional fit into either arcuate recess 60 or 61 on disc 50.

The outer periphery of disc 50 contains pairs of bores 77 (FIG. 13) to either side of slots 54 but spaced beyond the respective edges of slot 54 as well as the side walls of the clips 65. The respective clips 65 are assured their retention in their position on the peripheral edges of slots 54 by plate members 78 in cooperation with the arcuate projection 75. Each plate member 78 is an elongated member recessed as at 79 on one end defining an abutment 80 which forms a shoulder which can frictionally abut shoulders 71 and 72 of clip 65. Each plate member 78 has a pair of openings 82 which are spaced the same distance as the pairs of bores 77 along the periphery of disc 50. On aligning the openings 82 with bore 77, the plate members 78 can be rigidly secured to the periphery of disc 50 by rivets 83 extending through the respective aligned bores 77 and openings 82. Once the respective clips 65 are positioned onto the sides of the slots 54 by rotating the arcuately shaped projection 75 into their respective arcuate recesses 60 or 61 and with the positioning and riveting of the plate members 78 onto the periphery of the disc 50, the clips 65 are securely retained in their position to positively transfer the frictional forces of the splines 63 of the torque devices 62 during the braking action of the axially aligned brake stators and rotors in a manner well understood in the art.

A further modification of the cap clips is shown in FIGS. 16 through 19 wherein a cap clip 85 similar to that of cap clip 37 is shown as mounted on the periphery edge of a brake disc 86. Brake disc 86 is substantially identical to the above described brake disc 5' except that such brake disc 86 has a plurality of circumferentially spaced recesses or bores 87 on both annular surfaces along the outer periphery sufficiently spaced from a plurality of circumferentially spaced slots 88 similar to slots 15' in brake disc 5'. The depth of bores 87 is only sufficient to receive the projection on a bracket to be described and thus may more properly be referred to as recesses. Each slot 88 has a bottom surface 89 and two vertically disposed walls 90 and 91. Such walls 90 and 91 are substantially normal to their adjacent bottom surfaces or otherwise they may be considered disposed along a line parallel to a radial centerline of the disc 86.

The juncture of the bottom surface 89 and the adjacent walls 90 and 91 have arcuate recesses 92 for a purpose to be described. As the described disc 5, disc 86 is fabricated from a carbon material such as graphite or carbon fabric composite material.

A torque device 95 (a portion thereof shown in phantom lines in FIG. 17) circumferentially encompasses the outer periphery of the brake disc 86 (only a portion thereof shown in FIGS. 16 and 17). Torque device 95 has a plurality of splines or ribs 96 to provide a means for transferring the load or force on the brake disc 86 by its engagement with the slot 88.

Located in each slot 88 are a pair of spaced metal cap clips 85, which cap clips 85 have a flat planar top section 97, a pair of spaced sides 98 and 99, and a front section 100. Front section 100 is substantially at right angles to the top section 27 although the top section may curve slightly downwardly relative to such front section along the lines of the outer periphery of brake disc 86 such that when the metal cap clip 85 is inserted onto the edge of the disc 86 adjacent to the slot 88, top section 97 will frictional engage the outer peripheral edge of the brake disc 86 while the front section 100 frictionally contacts the front wall 90. The respective sides 98 and 99 have a pair of aligned bores 101 for a purpose to be described. The front section 100 of cap clip 85 has an arcuate extension or projection 102 that frictionally seats into the arcuate recess 92 thereby assuring the locking of the cap clip 85 onto the edge of disc 86. The front section 100, sides 98 and 99, and top section 97 of clip 85 defines an interior chamber 103.

A U-shaped bracket or retainer 105, with a pair of arm portions 106 and a bridging portion 107 has a pair of aligned projections 108 on the inner surface of arm portions 106 and a pair of aligned projections 110 on the outer surface of arm portions 106.

Installation of the cap clip onto the peripheral edge of brake disc 86 is to first assemble the U-shaped bracket or retainer 105 and the cap clip 85 as depicted by FIG. 19 wherein the projections 110 on retainer 105 are received by the bores 101 on the sides of cap clip 85 and thereafter rotating the combined assembly as shown in FIG. 19 so that the arcuate projection pivotingly slides into arcuate recess with the cap clip 85 and bracket 105 also pivoting until the projections 108 encounter recesses 87 to securely lock the cap clips on the disc 86.

A further modification of the invention is shown in FIGS. 20 through 24 wherein a brake disc 115 is shown with annular side walls 116 and 117 and with reduced thickness for the uppermost portion of such sidewalls similar to disc 5' and the other discs described to provide a shoulder 120 on each such annular side wall and the two circumferentially extending annular side walls 121 and 122. Such shoulder 120 is at the juncture of the flat annular side walls 116, 117 with the annular side walls 121, 122. The disc 115 has a plurality of circumferentially spaced slots 125 along its outer periphery. Each slot 125 has a bottom surface 126 and two side walls 127. The junctures of the bottom surface 126 with the side walls 127 are arcuately recessed as at 128 similar to the other described embodiments. The edges of the side walls 121 and 122, the edges of the shoulders 120 and the edges of the outer periphery are chamfered as shown in FIG. 20.

Located in each slot 125 are a pair of spaced metal clips 130 which define slot reinforcing means to provide means for driving contact from the torque drive means to the brake disc rotors 115 in a manner old and well known in the art.

Each metal clip 130 is generally U-shaped in configuration having a pair of side portions 131-132 and a bridging portion with a driving face 133 interconnecting such side portions. The uppermost edge portion of bridging portion 133 is recessed as at 134 for a purpose to be described. Extending downwardly from bridging portion 133 of clip 130 is an arcuate extension or arcuately shaped projection 135 that frictionally contacts the walls of the arcuately shaped recess 128 similarly to the other described embodiments. The interior walls of the side portions 131-132 have a pair of recesses 136.

Figure 22:
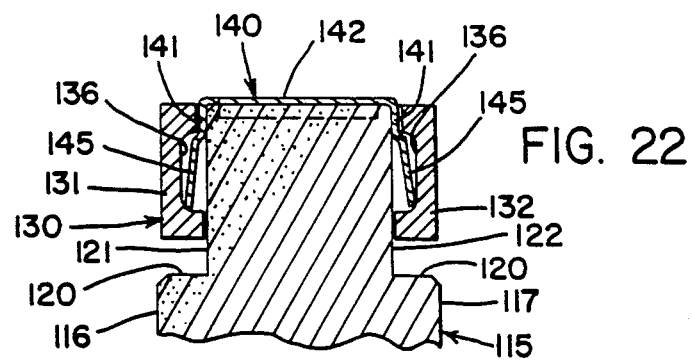
FIG. 22 is a cross-sectional view of the brake disc and clip shown in FIG. 21.
Figure 23:
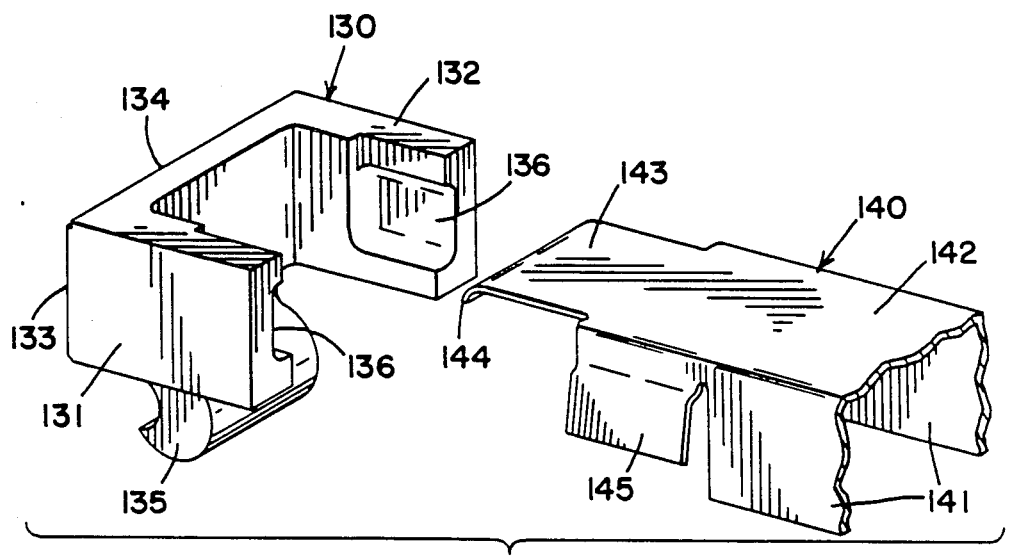
FIG. 23 is a perspective view of the insert and retainer shown in FIGS. 21 and 22.
Figure 24:
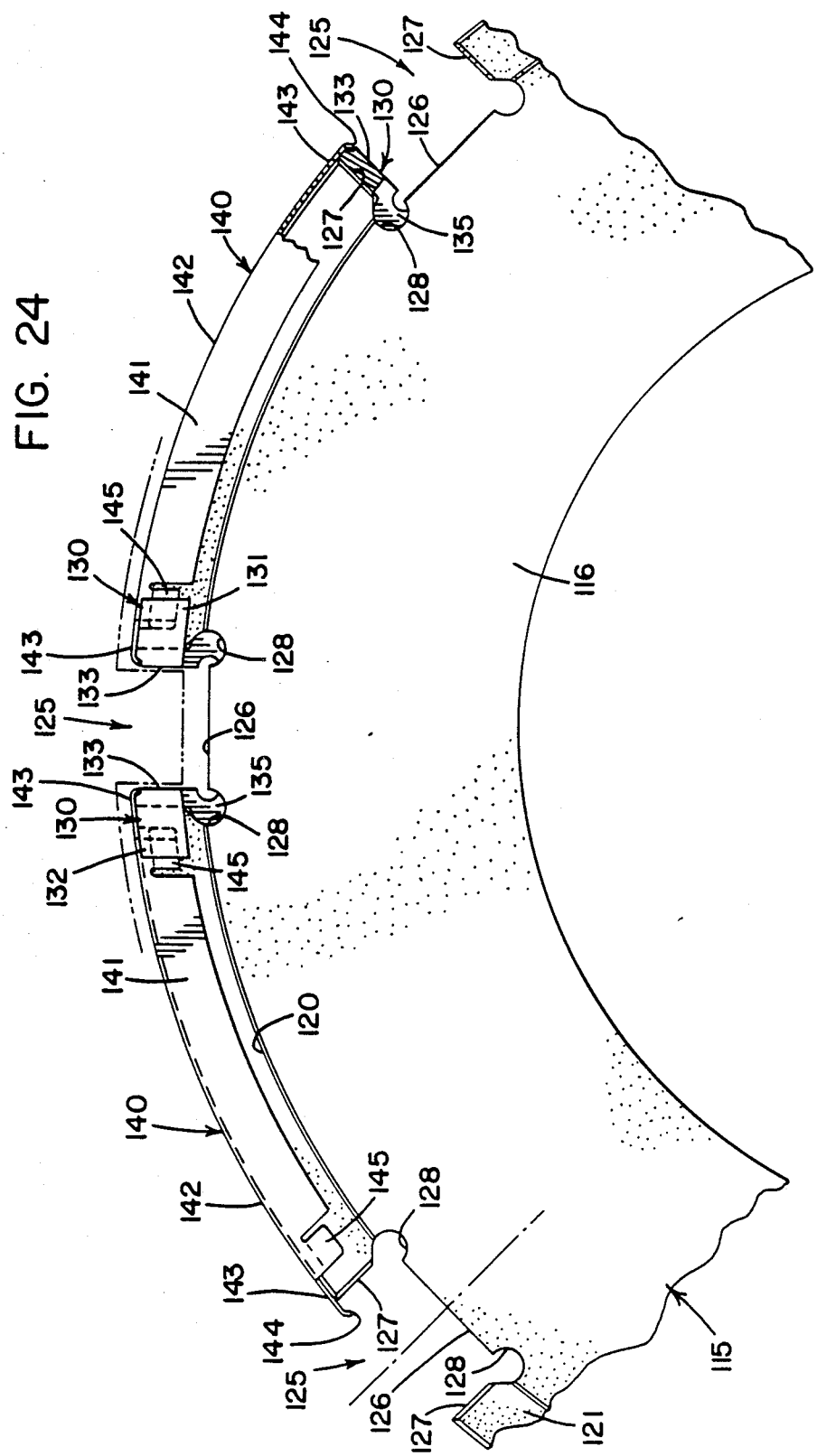
FIG. 24 is a fragmentary side elevational view of a brake disc with key slots of the clips shown in FIGS. 20–23 on a brake disc showing the clip and the retainer with a portion broken away to show the clip and retainer in cross section.

A U-shaped bracket or retainer 140 as seen in FIGS. 20 and 23 has a pair of downwardly disposed leg portions 141 and an upper horizontally disposed bridging portion 142. Bridging portion 142 has its forwardly disposed portion as seen in FIG. 24 recessed at the respective side edges to provide a forwardly disposed portion 143 which has an arcuately shaped end or edge 144 for engaging recess 134 in a manner to be described. The respective side portions 141 of bracket 140 have a spring clip 145 formed thereon as by cutting the forwardly disposed side portion of each side or leg portion 141 and thence pressing the clip 145 outwardly as depicted by FIG. 22 to provide resiliency thereto as in a spring clip through suitable heat treating process. In assembling the clip and the retainer 140 the purpose of the recesses 136 is to allow the spring clips 145 to spring outwardly into the recesses 136 to assure a secure fastening of the clips 130 to the retainer.

To assemble the clips 130 and the U-shaped bracket or retainer 140 onto the rotor brake disc 115, one clip 130 is first rocked into position in the same manner as the other described embodiment then the U-shaped bracket or retainer 140 is placed on the rotor and slid into the clip 130 as far as possible such that one arcuately shaped end or edge 144 projects beyond the clip 130 and the other arcuately shaped end or edge 144 rests in the top surface of brake disc 115. In this process the spring clip 145 of retainer 140 snaps into recess 136 of the clip 130. The recess 136 is sufficiently long along an arcuate path of the brake disc 115 to allow the spring clip 145 to move linearly and to allow the forwardly disposed edge 144 of retainer 140 to slide past the driving face 133 of the briding portion of clip 130. A second clip 130 is then rocked into place on the nearest face of an adjacent slot 125. U-shaped bracket or retainer 140 is then slid back along the periphery of the brake disc 115 until the forwardly disposed edge 144 of retainer 140 drops down over the edge 133 of the second clip 130 into the recess 134 and the spring clip 145 of the retainer 140 adjacent to such second clip 130 snaps into the recess 136 of such second clip 130. The retainer thus assures the retention of the clips in their respective positions in the slots 125 while preventing the oxidation of the periphery of the brake discs 115.

It will be apparent that, although a specific embodiment and certain modifications of the invention have been described in detail, the invention is not limited to the specifically illustrated and described constructions since variations may be made without departing from the principles of the invention.

I claim:

1. In a friction brake disc having a pair of annular flat wall surfaces, an inner peripheral wall surface, and an outer peripheral wall surface; said disc having a plurality of circumferentially spaced slots along the outer periphery extending into said outer peripheral wall surface and disposed for engagement by a spline of a torque device; each of said slots having a bottom surface and two spaced wall portions; the juncture of said bottom surface with each of said wall portions being recessed; a plurality of circumferentially spaced retainers are located on the periphery of such brake disc; each retainer extends arcuately between adjacent slots; each retainer is U-shaped in cross section to protect and cover said outer peripheral wall surface and adjacent portions of said annular flat wall surfaces; each of said slots having a pair of spaced oppositely disposed integral cap clips located on said spaced wall portions; each of said cap clips having a pair of spaced side walls abutting portions of said annular flat wall surfaces adjacent to said slots; each of said cap clips also having a flat frontal portion interconnecting adjacent ones of said pair of spaced side walls only and abuttingly engaging one of said wall portions of said slot; each cap clip having a projection for seating engagement with one of said recesses only to retain said cap clips in their respective positions on said brake disc and remain as two separate spaced cap clips with no interconnection therebetween, and each cap clip securing one end of an adjacent one of said retainers on said periphery of said brake disc.

2. In a friction brake disc as set forth in claim 1 wherein each of said retainers has clip means at the respective ends adjacent said slots, an each adjacent cap clip has a clip engaging means operative to engage said clip means for securing said retainers on said brake disc.

3. In a friction brake disc as set forth in claim 1 wherein all side walls of said cap clips are recessed to provide a recess therein, and each of said retainers has a pair of spring clip at their respective ends which engage said recesses of said cap clip.

4. In a friction brake disc as set forth in claim 3 wherein each retainer has a thin walled projecting lip at the respective end that extend along said outer peripheral wall surface and abuts said flat frontal portion of an adjacent cap clip.

* * * * *